(12) United States Patent
Kanellopoulos et al.

(10) Patent No.: US 10,450,391 B2
(45) Date of Patent: Oct. 22, 2019

(54) METHOD AND APPARATUS FOR POLYMERISING OLEFINS IN GAS PHASE

(71) Applicant: Borealis AG, Vienna (AT)

(72) Inventors: Vasileios Kanellopoulos, Linz (AT); Klaus Nyfors, Porvoo (FI); Pablo Ivan Aguayo Arellano, Leonding-Doppl (AT); Gunter Weickert, Ahaus (DE); Eric-Jan Prinsen, Aadorp (NL)

(73) Assignee: Borealis AG, Vienna (AT)

( * ) Notice: Subject to any disclaimer, the term of this patent is extended or adjusted under 35 U.S.C. 154(b) by 28 days.

(21) Appl. No.: 15/569,954

(22) PCT Filed: Jun. 10, 2016

(86) PCT No.: PCT/EP2016/063342
§ 371 (c)(1),
(2) Date: Oct. 27, 2017

(87) PCT Pub. No.: WO2016/198631
PCT Pub. Date: Dec. 15, 2016

(65) Prior Publication Data
US 2018/0155465 A1 Jun. 7, 2018

(30) Foreign Application Priority Data
Jun. 12, 2015 (EP) .................................. 15171820

(51) Int. Cl.
*C08F 2/00* (2006.01)
*C08F 10/02* (2006.01)
(Continued)

(52) U.S. Cl.
CPC .............. *C08F 10/02* (2013.01); *B01J 8/005* (2013.01); *B01J 8/006* (2013.01); *B01J 8/0055* (2013.01);
(Continued)

(58) Field of Classification Search
CPC ..................................... C08F 2/01; C08F 2/34
(Continued)

(56) References Cited

U.S. PATENT DOCUMENTS 4,877,587 A * 10/1989 Rhee ...................... B01J 8/1827
422/135
6,958,376 B2 * 10/2005 Muldowney ........... B01J 8/1818
422/131
(Continued)

FOREIGN PATENT DOCUMENTS

EP          2 495 038 A1    9/2012
WO     WO 2002/040146 A1    5/2002
(Continued)

OTHER PUBLICATIONS

International Search Report and Written Opinion from PCT/EP2016/063342 dated Aug. 5, 2016.

*Primary Examiner* — Rip A Lee
(74) *Attorney, Agent, or Firm* — Fay Sharpe LLP (57) ABSTRACT

The present invention deals with an olefin polymerisation process. At least one olefin is polymerised in gas phase in a fluidised bed in the presence of an olefin polymerisation catalyst in a polymerisation reactor having a vertical body; a generally conical downwards tapering bottom zone; a generally cylindrical middle zone above and connected to said bottom zone; and a generally conical upwards tapering top zone above and connected to said middle zone. Fluidisation gas is introduced to the bottom zone of the reactor from where it passes upwards through the reactor, and withdrawn from the top zone of the reactor. The gas is then compressed, cooled and returned into the bottom zone of the reactor. A fluidised bed is thus formed within the reactor where the growing polymer particles are suspended in the upwards rising gas stream wherein the superficial velocity of the fluidisation gas is less than the transport velocity of the (Continued)

particles. There is no fluidisation grid in the reactor. The fluidisation gas is passed from an inlet chamber into the bottom zone and the gas flows from the upper part of the inlet chamber to the lower part thereof and the gas flows from the lower part of the inlet chamber to the bottom zone.

20 Claims, 3 Drawing Sheets

(51) Int. Cl.
  *C08F 2/01* (2006.01)
  *C08F 2/34* (2006.01)
  *B01J 8/18* (2006.01)
  *B01J 8/00* (2006.01)
(52) U.S. Cl.
  CPC .......... *B01J 8/1818* (2013.01); *B01J 8/1827* (2013.01); *B01J 8/1836* (2013.01); *B01J 8/1863* (2013.01); *B01J 8/1872* (2013.01); *C08F 2/01* (2013.01); *C08F 2/34* (2013.01); *B01J 2208/00176* (2013.01); *B01J 2208/00893* (2013.01); *B01J 2208/00991* (2013.01); *C08F 2500/07* (2013.01)

(58) Field of Classification Search
  USPC .................................................. 526/920, 901
  See application file for complete search history.

(56) References Cited

U.S. PATENT DOCUMENTS

| | | | |
|---|---|---|---|
| 9,192,905 B2* | 11/2015 | Eriksson | B01J 8/1827 |
| 9,382,359 B2* | 7/2016 | Kanellopoulos | B01J 8/1827 |
| 2016/0354747 A1* | 12/2016 | Al-Haj Ali | C08F 10/00 |
| 2016/0355613 A1* | 12/2016 | Kanellopoulos | C08F 110/02 |

FOREIGN PATENT DOCUMENTS

| | | | | |
|---|---|---|---|---|
| WO | WO-0240146 A1 * | 5/2002 | ............ | B01J 8/1872 |
| WO | WO 2014/032794 A1 | 3/2014 | | |

* cited by examiner

METHOD AND APPARATUS FOR POLYMERISING OLEFINS IN GAS PHASE

This application is a 371 of PCT Patent Application Serial No. PCT/EP2016/063342, filed Jun. 10, 2016, which claims priority to European Patent Application Serial No. 15171820.2, filed Jun. 12, 2015.

FIELD OF THE INVENTION

The present invention is directed to the polymerisation of olefins in a fluidised bed reactor. More specifically, the present invention is directed to the polymerisation of olefins in a vertical fluidised bed reactor having no fluidisation grid.

Prior Art and Problem to be Solved

EP-A-2495037 and EP-A-2495038 disclose a process where olefins are polymerised in a fluidised bed reactor where the reactor does not contain a gas distribution plate. The superficial gas velocity within the bed in the cylindrical part was reported to be from 0.1 to 0.3 m/s.

In spite of the processes disclosed in the prior art there still remains a need for a process for olefin polymerisation which can be operated in a stable manner. Especially there remains a need for a process where the accumulation of polymer particles and agglomerates in the bottom part of the reactor is avoided.

SUMMARY OF THE INVENTION

As seen from one aspect the present invention provides an olefin polymerisation process comprising polymerising at least one olefin in gas phase in a fluidised bed in the presence of an olefin polymerisation catalyst in a polymerisation reactor having a vertical body; a generally conical downwards tapering bottom zone; a generally cylindrical middle zone above and connected to said bottom zone; and a generally conical upwards tapering top zone above and connected to said middle zone wherein (i) fluidisation gas is introduced to the bottom zone of the reactor from where it passes upwards through the reactor; (ii) the fluidisation gas is withdrawn from the top zone of the reactor, compressed, cooled and returned into the bottom zone of the reactor; (iii) a fluidised bed is formed within the reactor where the growing polymer particles are suspended in the upwards rising gas stream wherein the superficial velocity of the fluidisation gas is less than the transport velocity of the particles; and (iv) there is no fluidisation grid in the reactor; wherein the fluidisation gas is passed from an inlet chamber into the bottom zone and wherein the gas flows from the upper part of the inlet chamber to the lower part thereof and the gas flows from the lower part of the inlet chamber to the bottom zone and wherein the fluidisation gas is passed from the inlet chamber to the bottom zone via an inlet pipe which extends to the lower part of the inlet chamber.

As seen from another aspect the present invention provides a reactor for olefin polymerisation in gas phase having a vertical body and comprising: a generally conical downwards tapering bottom zone; a generally cylindrical middle zone above and connected to said bottom zone; and a generally conical upwards tapering top zone above and connected to said middle zone and wherein there is no fluidisation grid in the reactor, wherein an inlet chamber is located below the bottom zone and connected to the bottom part of the thereof, wherein said inlet chamber has a vertical generally cylindrical shape and has an upper part and a lower part and wherein an inlet pipe is connected to the bottom part of said bottom zone and wherein the inlet pipe extends to the lower part of the inlet chamber.

As seen from a further aspect the present invention provides the use of the reactor according to the description above for polymerising at least one olefin.

DETAILED DESCRIPTION

Definitions

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

Furthermore, when a reference to a diameter of a process vessel or piping is made then the internal diameter is meant.

As it is well understood in the art the superficial gas velocity denotes the velocity of the gas in an empty construction. Thus, the superficial gas velocity within the middle zone is the volumetric flow rate of the gas (in $m^3/s$) divided by the cross-sectional area of the middle zone (in $m^2$).

The olefins polymerised in the process of the present invention are typically alpha-olefins having from 2 to 10 carbon atoms. Preferably the olefins are ethylene or propylene, optionally together with one or more other alpha-olefins having from 2 to 8 carbon atoms. Especially preferably the process of the present invention is used for polymerising ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

Unless specifically otherwise defined, the percentage numbers used in the text refer to percentage by weight.

Catalyst

The polymerisation is conducted in the presence of an olefin polymerisation catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

One group of suitable Ziegler-Natta catalysts contains a magnesium compound, an aluminium compound and a titanium compound supported on a particulate support.

The particulate support can be an inorganic oxide support, such as silica, alumina, titania, silica-alumina and silica-titania. Preferably, the support is silica. The average particle size of the silica support can be typically from 10 to 100 µm. However, it has turned out that special advantages can be obtained if the support has median particle size from 6 to 40 μm, preferably from 6 to 30 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further group of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO 95/32994, U.S. Pat. Nos. 4,107,414, 4,186,107, 4,226, 963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581, 342, 4,657,882, EP 45976, EP 45977 and EP1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerisation Stages

The polymerisation in the fluidised bed may be preceded by prior polymerisation stages, such as prepolymerisation or another polymerisation stage conducted in slurry or gas phase. Such polymerisation stages, if present, can be conducted according to the procedures well known in the art. Suitable processes including polymerisation and other process stages which could precede the polymerisation process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. No. 4,582,816, 3,405,109, 3,324,093, EP-A-479186 and U.S. Pat. No. 5,391,654. As it is well understood by the person skilled in the art, the catalyst needs to remain active after the prior polymerisation stages.

Gas Phase Polymerisation

In the gas phase polymerisation reactor the polymerisation takes place in a fluidised bed formed by the growing polymer particles in an upwards moving gas stream. In the fluidised bed the polymer particles, containing the active catalyst, come into contact with the reaction gases, such as monomer, comonomer(s) and hydrogen which cause polymer to be produced onto the particles.

The polymerisation takes place in a reactor including a bottom zone, a middle zone and a top zone. The bottom zone forms the lower part of the reactor in which the base of the fluidised bed is formed. The base of the bed is formed in the bottom zone with no fluidisation grid, or gas distribution plate, being present. Above the bottom zone and in direct contact with it is the middle zone. The middle zone and the upper part of the bottom zone contain the fluidised bed. Because there is no fluidisation grid there is a free exchange of gas and particles between the different regions within the bottom zone and between the bottom zone and the middle zone. Finally, above the middle zone and in direct contact therewith is the top zone. Fluidised bed reactors of this type have been disclosed in EP-A-2495037, EP-A-2495038 and WO-A-2014032794.

The upwards moving gas stream is established by withdrawing a fluidisation gas stream from the top zone of the reactor, typically at the highest location. The gas stream withdrawn from the reactor is then compressed and cooled and re-introduced to the bottom zone of the reactor. Preferably, the gas is filtered before being passed to the compressor. Additional monomer, eventual comonomer(s), hydrogen and inert gas are suitably introduced into the circulation gas line. It is preferred to analyse the composition of the circulation gas, for instance, by using on-line gas chromatography and adjust the addition of the gas components so that their contents are maintained at desired levels.

According to the present invention there is an inlet chamber below the bottom zone. The fluidisation gas is passed from the inlet chamber to the bottom zone, for instance, via an inlet pipe. Conveniently, inlet chamber is located immediately below the bottom zone.

The fluidisation gas enters the upper part of the inlet chamber. The gas then travels downwards in the inlet chamber. Within the lower part of the inlet chamber the fluidisation gas enters the orifice or the inlet pipe through which it is passed to the bottom zone. The upper part of the inlet chamber is the part which is above the level of 0.7·H, wherein H is the height of the inlet chamber and the level is 0 at the bottom of the inlet chamber. Correspondingly, the lower part of the inlet chamber is the part which is at or below the level of 0.7·H.

Preferably, the gas enters the upper part of the inlet chamber via multiple feed pipes which are preferably symmetrically placed at the same vertical position around the inlet chamber. A suitable number of feed pipes is from 2 to 4, for instance 2 or 3.

Suitably, the inlet chamber has a shape of a vertical cylinder. The flow pattern is then conveniently obtained by an inlet pipe which is arranged to extend to the lower part of the inlet chamber. Preferably, the inlet pipe is concentric with the inlet chamber. Preferably the pipe extends to a level which is not higher than 0.7·H, more preferably not higher than 0.5·H, and most preferably not higher than 0.3·H.

The velocity of the gas flowing downwards within the inlet chamber and the gas flowing upwards within the inlet pipe is preferably not less than 9 m/s and more preferably not less than 12 m/s. With such flow speed it has been found that the accumulation of powder within the inlet chamber and the piping can be avoided, while oversized particles, agglomerates and lumps can be trapped at an early stage of their formation. It has been found that when the inlet pipe extends lower in the inlet chamber a lower gas velocity is needed to keep the inlet chamber clean from the polymer. Thus, a flow velocity of 9 m/s or more is sufficient when the inlet pipe extends to a level of less than or equal to 0.3·H or 0.4·H. However, if the inlet pipe does not extend to these levels but remains at a higher level, then the flow velocity needs to be greater, such as at least 12 m/s.

Preferably the ratio of the diameter of the middle zone to the diameter of the inlet chamber is within the range of from 1.5 to 4.5, more preferably from 1.7 and 4.3 and most preferably from 1.8 to 4.0. Moreover, the ratio of the diameter of the inlet chamber to the diameter of the inlet pipe is preferably within the range of 1.3 to 2.0, more preferably from 1.33 to 1.7 and most preferably from 1.4 to 1.66. Alternatively or additionally it is preferred that the ratio of the diameter of the middle zone to the diameter of the inlet pipe is from 2.0 to 7.0, more preferably from 2.25 to 6.5 and especially preferably from 2.5 to 6.0.

Preferably the ratio of the length of the inlet pipe within the inlet chamber to height of the inlet chamber is within the range of from 0.30 to 0.95, more preferably from 0.60 to 0.90 and most preferably from 0.70 to 0.85.

Preferably the bottom of the inlet chamber includes means for withdrawing polymer, such as polymer agglomerates from the inlet chamber. Such means are preferably an arrangement of sequentially operated valves. By opening and closing the valves polymer may be withdrawn from the inlet chamber.

The bottom zone of the reactor has a generally conical shape tapering downwards. Because of the shape of the zone, the gas velocity gradually decreases along the height within said bottom zone. The gas velocity in the lowest part is greater than the transport velocity of the particles contained in the fluidised bed and thus the particles eventually contained in the gas are transported upwards with the gas. At a certain height within the bottom zone the gas velocity becomes smaller than the transport velocity and a fluidised bed starts to form. When the gas velocity becomes still smaller the bed becomes denser and the polymer particles distribute the gas over the whole cross-section of the bed.

Preferably, the equivalent cross-sectional diameter of the bottom zone is monotonically increasing with respect to the flow direction of the fluidisation gas through the fluidised bed reactor. As the flow direction of the fluidisation gas is upwards with respect to the base, the equivalent cross-sectional diameter of the bottom zone is vertically monotonically increasing.

The bottom zone preferentially has straight circular cone shape. More preferably, the cone-angle of the cone-shaped bottom zone is 5° to 35°, even more preferably 7° to 30° and most preferably 9° to 25°, whereby the cone-angle is the angle between the axis of the cone and the lateral surface. It is not necessary in this preferred embodiment, however, that the bottom zone has the shape of a perfect cone but it may also have a shape of a truncated cone.

The bottom zone may also be seen as being constructed of a plurality of conical sections having different cone-angles. In such a case it is preferred that at least the conical section where the base of the fluidised bed is formed has the cone-angle within the above-specified limits. In a most preferred embodiment all the conical sections forming the bottom zone have the cone-angles within the above-specified limits. If the bottom zone comprises multiple conical sections it is then preferred that the steeper sections with a narrower cone angle are located at the lower end of the bottom zone and the sections with a wider cone angle are located at the higher end of the bottom zone. Such arrangement is believed to prevent the polymer from adhering to the walls. It further enhances the gas-solids mixing efficiency at the bottom part of the fluidised bed reactor. The risk of forming stagnant zones in the bottom part of the reactor is thereby reduced.

It is further preferred that the equivalent diameter of the bottom zone increases from about 0.1 to about 1 metres per one metre of height of the bottom zone (m/m). More preferably, the diameter increases from 0.15 to 0.8 m/m and in particular from 0.2 to 0.6 m/m.

The preferred cone-angles lead to additional improved fluidisation behaviour and avoid the formation of stagnant zones. As a result, the polymer quality and stability of the process are improved. Especially, a too wide cone-angle leads to an uneven fluidisation and poor distribution of the gas within the bed. While an extremely narrow angle has no detrimental effect on the fluidisation behaviour it anyway leads to a higher bottom zone than necessary and is thus not economically feasible.

The fluidised bed reactor of the present invention comprises no gas distribution grid and/or plate. The even distribution of the fluidisation gas within the bed is achieved by the shape of the bottom zone. The omission of the gas distribution grid reduces the number of locations where fouling and chunk formation can start. The terms gas distribution grid or gas distribution plate or fluidisation grid are used synonymously to denote a metal plate or a construction within the reactor which has a purpose of distributing the fluidisation gas evenly throughout the cross-sectional area of the reactor. In the reactors where a gas distribution grid is used it generally forms the base of the fluidised bed. Typically, the fluidised bed reactor of the present invention does not comprise a gas deflector element either. Thereby the gas enters the bottom zone of the reactor through a simple orifice without additional flow diverting elements downstream the orifice. This leads to a simple design of the reactor with a reduced risk of chunk or sheet formation.

The middle zone of the fluidised bed reactor has a generally cylindrical shape. Preferably it will be in the form of a straight circular cylinder being denoted herein simply cylinder. From a more functional perspective, the middle zone will essentially form a domain wherein the superficial velocity of the fluidisation gas is essentially constant.

The middle zone typically contains most of the fluidised bed. While the bed extends to the bottom and top zones also, its major part is within the middle zone.

The middle zone preferably has a ratio of the height over diameter (L/D) of at least about 3, more preferably at least about 4. The height over diameter is typically not more than 15, preferably not more than 10.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor.

It has been found that the gas flow needed to obtain good conditions without excess entrainment of polymer from the bed, on one hand, and reduced adhesion of polymer on the walls, on the other hand, depends on the properties of the polymer powder. It has been found that the gas velocity within the middle zone of the reactor should preferably be chosen such that the dimensionless number, $N_{Br}$, is at least 2.5, more preferably within the range of from 2.5 to 7, and in particular from 2.5 to 5. The number $N_{Br}$ can be calculated by using equation (I):

$$N_{Br} = \frac{\frac{d_{90} - d_{10}}{d_{50}}}{\frac{U_s}{U_t}} \quad \text{(I)}$$

In equation (I) $d_{90}$ denotes the smallest equivalent particle diameter such that 90% of all particles within the bed have a smaller equivalent diameter than $d_{90}$; $d_{10}$ denotes the smallest equivalent particle diameter such that 10% of all particles within the bed have a smaller equivalent diameter than $d_{10}$; $d_{50}$ represents the median equivalent particle diameter of the particles within the bed; $U_s$ is the superficial gas velocity within the middle zone; and $U_t$ is the terminal velocity of the particles within the reactor. According to Geldart (Gas Fluidisation Technology, John Wiley & Sons, 1986), equation 6.16, the terminal velocity in turbulent regime can be calculated from the equation (II) below:

$$U_t = \sqrt{\frac{4}{3} \cdot \frac{(\rho_p - \rho_g) \cdot g \cdot d_v}{K_N \cdot \rho_g}} \quad \text{(II)}$$

In equation (II) $\rho_p$ denotes the particle density (which is the mass of the particle divided by its hydrodynamic volume; the volume of eventual pores is included in the hydrodynamic volume, see explanations in section 6.12 of Geldart), $\rho_g$ is the density of the fluidisation gas, g is the gravity acceleration constant (9.81 m/s$^2$), $d_v$ is the volume diameter of the particles (median volume diameter if the particles have different diameters), and $K_N$ is a correction factor. According to Geldart $K_N$ can be calculated from equation (III).

$$K_N = 5.31 - 4.88 \cdot \psi \quad \text{(III)}$$

In equation (III) $\psi$ denotes the ratio of the surface area of the equivalent volume sphere to the surface area of the particle, or $(d_v/d_s)^2$, where $d_v$ is the (median) volume diameter and $d_s$ is the (median) surface diameter of the particle (see Section 2.2 of Geldart).

The $d_{90}$, $d_{10}$ and $d_{50}$ values are suitably and preferably volume diameters and the percentages 90%, 10% and 50% are based on the mass of the particles. However, as the ratio is dimensionless it is not absolutely mandatory for $d_{90}$, $d_{10}$ and $d_{50}$ to represent the volume diameter, but they may also represent another, such as surface per volume or surface, diameter as long as they all represent the same diameter.

The number $N_{Br}$ is a useful characteristic to describe the fluidisation regime in the fluidised bed. At low values of $N_{Br}$ the bed is in transport conditions. When $N_{Br}$ increases the bed goes over to fluidised conditions, first to entrained fluidisation, then bubbling fluidisation and finally minimum fluidisation.

For low values of $N_{Br}$ of less than 2.5 the bed is in transport conditions. Thereby a substantial entrainment of polymer from the bed takes place depending on particles' size and size distribution. Operation in this regime increases the risk of producing fines due to particle attrition. Powder mixing will be reduced as there is mainly conveying. Cyclone separation efficiency is also reduced and the risk of blocking solids transport line increases. On the other hand, for high values of $N_{Br}$ of greater than 7 the bed is in standard bubbling conditions and then mass and heat transfer may become less efficient. The solids mixing may be ineffective, increasing the risk of fouling and agglomeration of particles. The operation of the reactor may become less stable, leading to an increased risk of reactor shut-down. Further, the risk for solids segregation in the reactor is increased.

The height L of the middle zone is the distance of the lowest point of the generally cylindrical part of the reactor to the highest point of the generally cylindrical part of the reactor. The lowest point of the generally cylindrical part is the lowest point above which the diameter of the reactor no longer increases with the height of the reactor but remains constant. The highest point of the generally cylindrical part is the lowest point above which the diameter of the reactor no longer remains constant with the height of the reactor but decreases. The diameter D of the middle zone is the (equivalent) diameter of the reactor within the generally cylindrical part.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat transfer. Further the high velocity of the gas and particles vicinal to the inner walls minimizes lump- and sheet formation. The top zone has a generally conical, upwards tapering shape. It is further preferred that the ratio of the height of the top zone to the diameter of the middle zone is within the range of from 0.3 to 1.5, more preferably 0.5 to 1.2 and most preferably 0.7 to 1.1.

It is particularly preferred that the cone forming the top zone is a straight circular cone and the cylinder forming the middle zone preferably is a circular cylinder. More preferably the cone-angle of the cone-shaped top zone is 10° to 50°, most preferably 15 to 45°. As defined above, the cone-angle is the angle between the axis of the cone and the lateral area.

The specific cone-angles of the cone-shaped upper zone further improve the tendency for back-flow of the particles counter-current to the fluidisation gas. The resulting unique pressure balance leads to an intensive break up of bubbles, whereby the space-time-yield is further improved. Further as mentioned above, the wall flow velocity, i.e., the velocity of particles and gas vicinal to the inner walls is high enough to avoid the formation of lumps and sheets.

Polymer is withdrawn from the reactor. One part of the polymer may be withdrawn by using the cyclone installed in the circulation gas stream. However, the amount of polymer withdrawn therefrom is usually not sufficient for withdrawing the whole polymer production from the reactor. Therefore, it is preferred to withdraw polymer also from the reactor, especially preferably from the middle zone of the reactor.

The polymer is withdrawn from the middle zone in any manner known in the art, either intermittently or continuously. It is preferred to withdraw the polymer continuously because then the conditions in the reactor fluctuate less than with intermittent withdrawal. Both methods are well known in the art. Continuous withdrawal is disclosed, among others, in WO-A-00/29452, EP-A-2330135 and EP-A-2594433. Intermittent withdrawal is disclosed, among others, in U.S. Pat. No. 4,621,952, EP-A-188125, EP-A-250169 and EP-A-579426.

In a preferred continuous withdrawal method the polymer is withdrawn through an open pipe. In one preferred embodiment the pipe is equipped with a control valve whose position is automatically adjusted to maintain a desired outflow rate. The valve position may be set, for instance, by the reactor bed level controller. In another preferred embodiment the pipe discharges the polymer to a vessel, the pressure of which is controlled to maintain a desired pressure difference between the reactor and the vessel. The pressure difference then sets the polymer flow rate from the reactor to the vessel.

The agglomerates eventually present in the reactor may be withdrawn by using one of the powder outlets, as disclosed in EP-A-2594433. However, it is also possible and preferred to withdraw them through a separate outlet which is preferably located within the bottom zone and suitably below the base of the fluidised bed. After recovering the agglomerates may be disposed of or they may be crushed and mixed with the product.

Catalyst, which is optionally dispersed within polymer, is introduced into the reactor, suitably into the fluidised bed. Any method known in the art may be used for introducing the catalyst. According to one method the catalyst, or the polymer containing the catalyst, is introduced in a stream of inert gas. According to another method the catalyst is introduced as slurry in a liquid diluent.

It is possible to introduce the catalyst, optionally dispersed within polymer particles, also into the bottom zone to the level where the base of the bed is formed or even below it. The fluidisation gas then transports the particles into the fluidised bed. This is especially useful when the gas phase reactor is preceded by a prior polymerisation stage. The catalyst is then dispersed within the polymer particles formed in the prior polymerisation stage.

Post-Reactor Treatment

When the polymer has been removed from the polymerisation reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C. Such processes are disclosed, among others, in WO-A-2008015228 and WO-A-2008080782.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Benefits of the Invention

The present invention can be operated for long periods of time with reduced down-time. The accumulation of polymer particles in the bottom part of the reactor is avoided. According to the claimed process the gas-solid mixing is more efficient and the heat removal capabilities are higher compared to conventional bubbling fluidized bed reactors. In addition, increased polymer homogeneity in terms of narrowing the particle size and residence time distributions can be achieved, besides, polymer throughput can significantly increase. It also exhibits less risk of forming agglomerates, sheets and chunking. Moreover, polymer particles with broad particle size distribution can be properly fluidized without experiencing particle segregation issues. Finally, the mean residence time is short, the space-time-yield is high and the reactor volume needed for a given throughput is smaller compared to the typical gas phase fluidized bed reactors.

DESCRIPTION OF THE DRAWINGS

Figure 1:
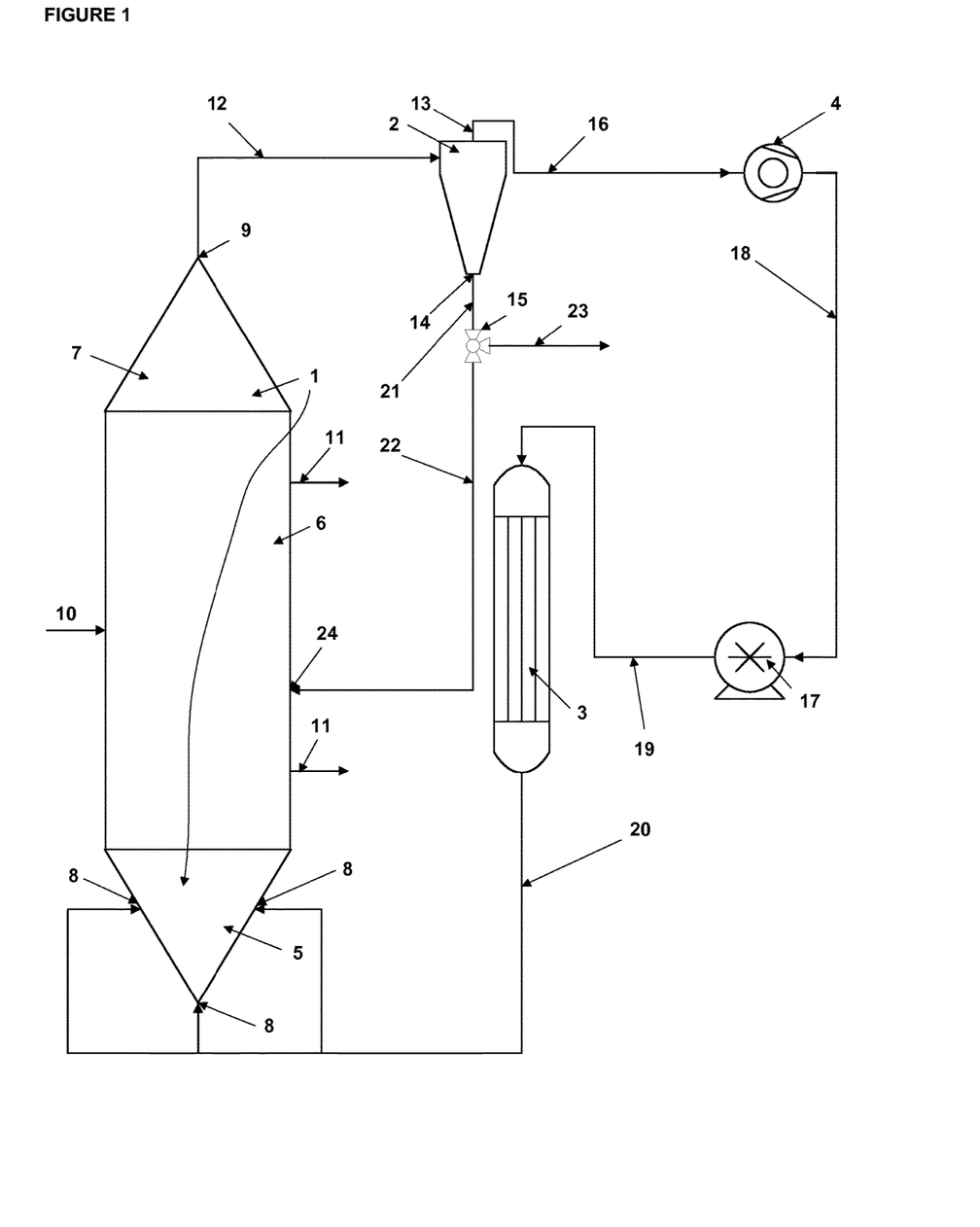
FIG. 1 is a simplified process diagram illustrating the process of the prior art, such as WO-A-2014032794.

FIG. 1 shows a prior art reactor system. The reactor (1) has a bottom zone (5), a middle zone (6) and a top zone (7).

The fluidisation gas is introduced into the bottom zone (5) through the opening (8). While the gas flows upwards through the bottom zone (5) its superficial velocity reduces due to the increasing diameter. A fluidised bed starts to form within the bottom zone (5). The gas continues to travel upwards through the middle zone (6) where the gas velocity is constant and the bed is fully formed. Finally the gas reaches the top zone (7) from where it is withdrawn through the opening (9). The gas, together with entrained solids, passes along line (12) to a cyclone (2). The cyclone (2) removes most of the entrained solid from the circulation gas which is passed through the gas outlet (13) along the lines (16) and (18) to a compressor (17). Before the compressor (17) there is preferably a filter (4). In the compressor (17) the gas is pressurized and passed through line (19) to a cooler (3) where it is cooled. From the cooler (3) the gas is passed along the line (20) into the inlet (8) of the reactor (1).

The solid stream is passed from the cyclone (2) through the opening (14) to line (21). By using a valve (15) the solid stream may be either withdrawn and sent to further processing along line (23) or returned into the reactor (1) along line (22) through the opening (24).

The polymer as product is withdrawn from the reactor (1) along one or more outlets (11). Catalyst, optionally dispersed within polymer particles from a preceding polymerisation stage, is introduced into the reactor (1) along line (10). Additional monomer, comonomer, hydrogen and inert gas may be introduced at a convenient location of the circulation gas line (16, 18, 19, 20).

Figure 2:
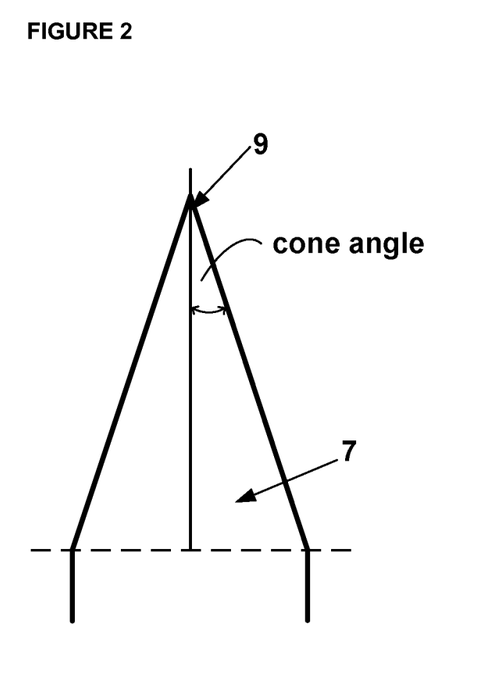
FIG. 2 is a schematic drawing illustrating the top zone of the reactor.

FIG. 2 is a schematic drawing of the top zone (7). Within the top zone, usually at its highest location, there is an opening (9) for withdrawing circulation gas from the reactor.

Figure 3:
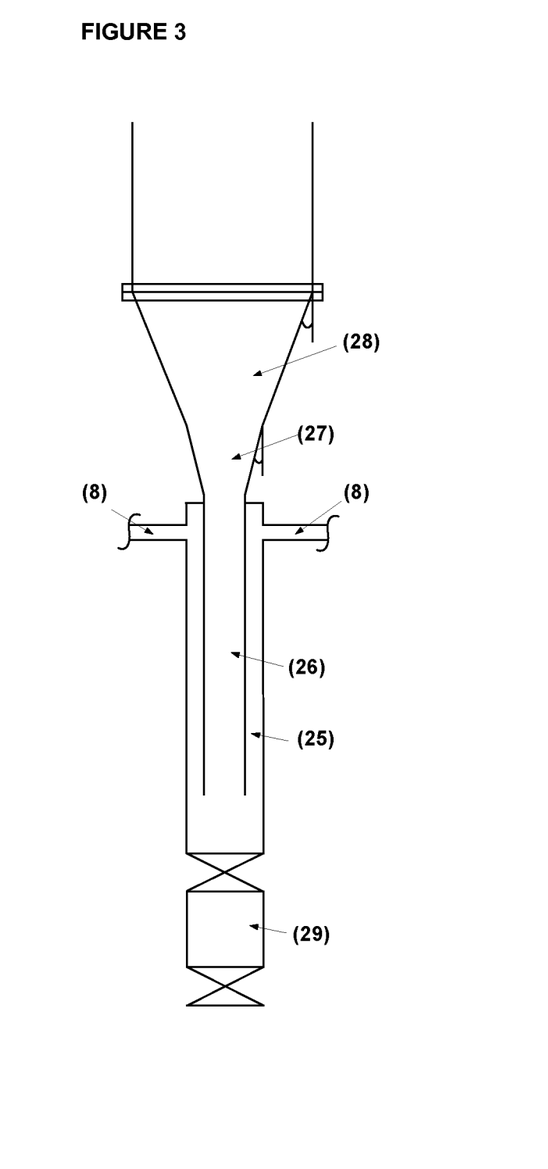
FIG. 3 is a schematic drawing illustrating the bottom zone and the inlet chamber of the present invention.

FIG. 3 shows the design of the bottom part of a reactor according to the present invention. The reactor comprises the bottom zone with the inlet chamber (25). The fluidisation gas enters the upper part of the inlet chamber (25) through one or more openings (8). The gas travels downwards in the inlet chamber (25). Within the lower part of the inlet chamber the fluidisation gas enters the inlet pipe (26) from where it is passed to the bottom zone. The bottom zone comprises two conical sections, a steep one with the narrower cone angle (27) located at the lower end of the bottom zone and a second with a wider cone angle (28) located at the higher end of the bottom zone. The inlet chamber is also equipped with means for withdrawing polymer which consists of an arrangement of sequentially operated valves. When polymer is removed from the bottom of the inlet chamber the top valve opens while the bottom valve remains shut. This allows the polymer to flow through the top valve into a discharge chamber (29). After a suitable period the top valve closes. When the top valve is completely shut the bottom valve opens thus allowing polymer to discharge from the discharge chamber (29). Then the bottom valve closes and when it is fully closed the sequence can be started again.

EXAMPLES

In Examples 1 to 5 the reactor was operated at an absolute pressure of 20 bars and a temperature of 85° C. Propane was used as the fluidisation gas. The bed was formed of high density polyethylene particles having an average diameter ($d_{50}$) of 200 μm. HDPE had a density of 950 kg/m³ and $MFR_5$ of 0.27 g/10 min. The invention was exemplified with a reactor assembly having the following properties:
Height of the bottom zone: 900 mm
Height of the middle zone: 1500 mm
Height of the top zone 415 mm
Diameter of the middle zone 300 mm
Cone angle of the bottom zone 20°

Below the bottom zone there was an inlet chamber as shown in FIG. 3 which was connected to the bottom zone via an orifice having a diameter of 100 mm. The inlet chamber had a vertical cylindrical body with a height of 600 mm and an external diameter of 150 mm. An inlet pipe having an external diameter of 100 mm was mounted to the orifice. The pipe extended 300 mm downwards in the inlet chamber.

Example 1

The reactor as described above was operated so that the gas velocity in the inlet pipe was 9 m/s. The reactor operated in a stable manner. After a period of 2 hr operation the inlet chamber was opened and examined. A substantial amount of polymer powder was found at the bottom of the inlet chamber.

Example 2

The procedure of Example 1 was repeated with the exception that the gas flow was increased so that the gas velocity in the inlet pipe was 12 m/s. The reactor operated in a stable manner. After a period of 2 hr operation the inlet chamber was opened and examined. A small amount of polymer powder was found at the bottom of the inlet chamber.

Example 3

The procedure of Example 1 was repeated with the exception that the gas flow was increased so that the gas velocity in the inlet pipe was 20 m/s. The reactor operated in a stable manner. After a period of 2 hr operation the inlet chamber was opened and examined. Practically no polymer powder was found at the bottom of the inlet chamber.

For Examples 4 and 5 the reactor was modified so that the inlet pipe extended 500 mm downwards at the bottom of the inlet chamber.

Example 4

The procedure of Example 1 was repeated with the exception that the reactor with the inlet pipe extending 500 mm in the inlet chamber was used. The reactor operated in a stable manner. After a period of 2 hr operation the inlet chamber was opened and examined. A very small amount of polymer powder was found at the bottom of the inlet chamber.

Example 5

The procedure of Example 4 was repeated with the exception that the gas flow was increased so that the gas velocity in the inlet pipe was 12 m/s. The reactor operated in a stable manner. After a period of 2 hr operation the inlet chamber was opened and examined. Practically no polymer powder was found at the bottom of the inlet chamber.

| Example | L, mm | 1-L/H | V, m/s | Powder in the inlet chamber |
|---|---|---|---|---|
| 1 | 300 | 0.5 | 9 | Yes |
| 2 | 300 | 0.5 | 12 | Some |
| 3 | 300 | 0.5 | 20 | No |

-continued

| Example | L, mm | 1-L/H | V, m/s | Powder in the inlet chamber |
|---------|-------|-------|--------|------------------------------|
| 4 | 500 | 0.17 | 9 | Very small amount |
| 5 | 500 | 0.17 | 12 | No |

The invention claimed is:

1. An olefin polymerization process comprising polymerizing at least one olefin in gas phase in a fluidized bed in the presence of an olefin polymerization catalyst in a polymerization reactor having a vertical body; a generally conical downward tapering bottom zone; a generally cylindrical middle zone above and connected to said bottom zone; and a generally conical upward tapering top zone above and connected to said middle zone, wherein
   (i) fluidization gas is introduced to the bottom zone of the polymerization reactor from where it passes upward through the polymerization reactor;
   (ii) the fluidization gas is withdrawn from the top zone of the polymerization reactor, compressed, cooled and returned into the bottom zone of the polymerization reactor;
   (iii) a fluidized bed is formed within the polymerization reactor where growing polymer particles are suspended in an upward rising gas stream wherein a superficial velocity of the fluidization gas is less than a transport velocity of the polymer particles; and
   (iv) there is no fluidization grid in the polymerization reactor; wherein the fluidization gas is passed from an inlet chamber into the bottom zone and wherein the fluidization gas flows from an upper part of the inlet chamber to a lower part thereof and the fluidization gas flows from the lower part of the inlet chamber to the bottom zone and wherein the fluidization gas is passed from the inlet chamber to the bottom zone via an inlet pipe which extends to the lower part of the inlet chamber.

2. The process according to claim 1, wherein a velocity of the fluidization gas flowing upward within the inlet pipe is sufficiently high to prevent accumulation of polymer particles within the inlet chamber.

3. The process according to claim 1, wherein the inlet pipe extends to a level within the inlet chamber so that a ratio of a length of the inlet pipe within the inlet chamber to height of the inlet chamber is within a range of from 0.30 to 0.95, or from 0.60 to 0.90 and or from 0.70 to 0.85.

4. The process according to claim 1, wherein a velocity of the gas flowing upward within the inlet pipe is not less than 9 m/s.

5. The process according to claim 4, wherein the velocity of the gas flowing upward in the inlet pipe is not less than 12 m/s.

6. The process according to claim 1, wherein a gas velocity in the middle zone of the polymerization reactor is such that $N_{Br}$ is within a range of from 2.5 to 7 wherein $N_{Br}$ is calculated according to the formula $$N_{Br} = \frac{\frac{d_{90} - d_{10}}{d_{50}}}{\frac{U_s}{U_t}}$$

wherein $d_{90}$ represents a smallest equivalent particle diameter so that 90% of the polymer particles have a smaller equivalent diameter than $d_{90}$; $d_{10}$ represents the smallest equivalent particle diameter so that 10% of the polymer particles have a smaller equivalent diameter than $d_{10}$; $d_{50}$ represents the median equivalent particle diameter; $U_s$ is a superficial gas velocity within the middle zone; and $U_t$ is a terminal velocity of the polymer particles within the polymerization reactor.

7. A reactor for olefin polymerization in gas phase having a vertical body and comprising:
   a generally conical downward tapering bottom zone;
   a generally cylindrical middle zone above and connected to said bottom zone; and
   a generally conical upward tapering top zone above and connected to said middle zone and wherein there is no fluidization grid in the reactor wherein an inlet chamber is located below the bottom zone and connected to a bottom part of the thereof,
   wherein said inlet chamber has a vertical generally cylindrical shape and has an upper part and a lower part and wherein an inlet pipe is connected to the bottom part of said bottom zone and wherein the inlet pipe extends to the lower part of the inlet chamber.

8. The reactor according to claim 7, wherein a ratio of a diameter of the middle zone to the diameter of the inlet chamber is within a range of from 1.5 to 4.5, or from 1.7 and 4.3, or from 1.8 to 4.0.

9. The reactor according to claim 7, wherein a ratio of an internal diameter of the inlet chamber to an internal diameter of the inlet pipe is within a range of from 1.3 to 2.0, or from 1.33 to 1.7, or from 1.4 to 1.66.

10. The reactor according to claim 7, wherein a ratio of a length of the inlet pipe within the inlet chamber to a height of the inlet chamber is within a range of from 0.30 to 0.95, or from 0.60 to 0.90, or from 0.70 to 0.85.

11. The reactor according to claim 7, wherein a ratio of a diameter of the middle zone to a diameter of the inlet pipe is from 2.0 to 7.0, or from 2.25 to 6.5, or from 2.5 to 6.0.

12. The reactor according to claim 7, wherein the inlet chamber includes means for withdrawing polymer from a bottom of the inlet chamber.

13. The reactor according to claim 12, wherein the means for withdrawing polymer from the bottom of the inlet chamber comprises sequentially operated valves.

14. A method comprising polymerizing at least one olefin in the reactor according to claim 7.

15. The reactor according to claim 8, wherein a ratio of the internal diameter of the inlet chamber to an internal diameter of the inlet pipe is within a range of from 1.3 to 2.0, or from 1.33 to 1.7, or from 1.4 to 1.66.

16. The reactor according to claim 8, wherein a ratio of a length of the inlet pipe within the inlet chamber to a height of the inlet chamber is within a range of from 0.30 to 0.95, or from 0.60 to 0.90, or from 0.70 to 0.85.

17. The reactor according to claim 9, wherein a ratio of a length of the inlet pipe within the inlet chamber to a height of the inlet chamber is within a range of from 0.30 to 0.95, or from 0.60 to 0.90, or from 0.70 to 0.85.

18. The reactor according to claim 8, wherein a ratio of the diameter of the middle zone to a diameter of the inlet pipe is from 2.0 to 7.0, or from 2.25 to 6.5, or from 2.5 to 6.0.

19. The reactor according to claim 8, wherein the inlet chamber includes means for withdrawing polymer from a bottom of the inlet chamber.

20. The reactor according to claim 9, wherein the inlet chamber includes means for withdrawing polymer from a bottom of the inlet chamber.

\* \* \* \* \*